United States Patent
Werner

(10) Patent No.: US 8,711,999 B2
(45) Date of Patent: Apr. 29, 2014

(54) INSPECTION TOOL FOR TOP GUIDES OF A BOILING WATER REACTOR

(75) Inventor: Charles E. Werner, Lynchburg, VA (US)

(73) Assignee: AREVA Inc., Lynchburg, VA (US)

( * ) Notice: Subject to any disclaimer, the term of this patent is extended or adjusted under 35 U.S.C. 154(b) by 533 days.

(21) Appl. No.: 12/730,366

(22) Filed: Mar. 24, 2010

(65) Prior Publication Data

US 2011/0235767 A1    Sep. 29, 2011

(51) Int. Cl.
*G21C 17/00* (2006.01)

(52) U.S. Cl.
USPC .............................. 376/249; 376/248; 376/305

(58) Field of Classification Search
USPC ......... 376/249, 245, 308–310, 248, 305, 438, 376/440, 462; 73/618–626
See application file for complete search history.

(56) References Cited

U.S. PATENT DOCUMENTS

| | | | | |
|---|---|---|---|---|
| 3,736,552 | A | * | 5/1973 | Sessler et al. ........................ 367/7 |
| 4,826,650 | A | * | 5/1989 | Richardson et al. ............ 376/249 |
| 5,145,637 | A | * | 9/1992 | Richardson et al. ............ 376/249 |
| 5,407,376 | A | * | 4/1995 | Avital et al. ..................... 446/175 |
| 5,504,788 | A | * | 4/1996 | Brooks et al. ................... 376/248 |
| 5,692,024 | A | | 11/1997 | McClelland et al. |
| 6,016,701 | A | | 1/2000 | McClelland et al. |
| 7,092,477 | B2 | | 8/2006 | Wivagg et al. |
| 8,526,564 | B2 | * | 9/2013 | Carbonell et al. ............ 376/249 |

FOREIGN PATENT DOCUMENTS

| | | | | | |
|---|---|---|---|---|---|
| JP | 61066162 | A | * | 4/1986 | ............ G01N 29/04 |
| JP | 62067446 | A | * | 3/1987 | ............ G01N 29/04 |

OTHER PUBLICATIONS

English translation of JP 62067446, published Mar. 1987.*
The Source, vol. V No. 2, Apr. 2009 (accessed Feb. 19, 2010 from http://www.us.areva-np.com/enewsletters/TheSource/The.Source_Vol.V_no.03_print.html).

* cited by examiner

*Primary Examiner* — Cassie Galt
(74) *Attorney, Agent, or Firm* — Davidson, Davidson & Kappel, LLC

(57) ABSTRACT

A tool for inspecting a cell formed by grid beams of a top guide structure in a nuclear reactor is provided. The tool includes a camera; a support structure coupled to the camera for contacting at least one of the grid beams to support the camera within the cell; and at least one actuator moving the camera with respect to the support structure and along one of the grid beams, the at least one actuator coupling the camera to the support structure. A method for inspecting a cell formed by grid beams of a top guide structure in a nuclear reactor is also provided.

21 Claims, 6 Drawing Sheets

INSPECTION TOOL FOR TOP GUIDES OF A BOILING WATER REACTOR

The present invention relates generally to inspection of boiling water reactors and more specifically to visual inspection of top guides of boiling water reactors.

BACKGROUND OF INVENTION

Conventionally, inspection of grid beams forming top guide structures in boiling water reactors are performed by an In-Vessel Visual Inspection (IVVI) Level II inspector and camera handler hanging a camera handled by its cable from a refuel bridge or an auxiliary bridge. This method may be time consuming, may expend too much dose and may not provide stability necessary for such an inspection.

U.S. Pat. No. 5,692,024 discloses an underwater crawler vehicle that rides on the top edges of two parallel grid members of a top guide structure and positions an inspection system to enable volumetric inspection of each grid member. The inspection system includes an ultrasonic inspection instrument to inspect the top guide structure.

BRIEF SUMMARY OF THE INVENTION

A tool for inspecting a cell formed by grid beams of a top guide structure in a nuclear reactor is provided. The tool includes a camera; a support structure coupled to the camera for contacting at least one of the grid beams to support the camera within the cell; and at least one actuator moving the camera with respect to the support structure and along one of the grid beams, the at least one actuator coupling the camera to the support structure.

A method for inspecting a cell formed by grid beams of a top guide structure in a nuclear reactor is also provided. The method includes providing a tool including a camera within the cell so that the tool contacts at least one of the grid beams and sits within the cell; and inspecting a first grid beam of the grid beams while the tool sits within the cell by moving the camera along the first of the grid beams.

BRIEF DESCRIPTION OF THE DRAWINGS

The present invention is described below by reference to the following drawings, in which.

DETAILED DESCRIPTION

Figure 1:
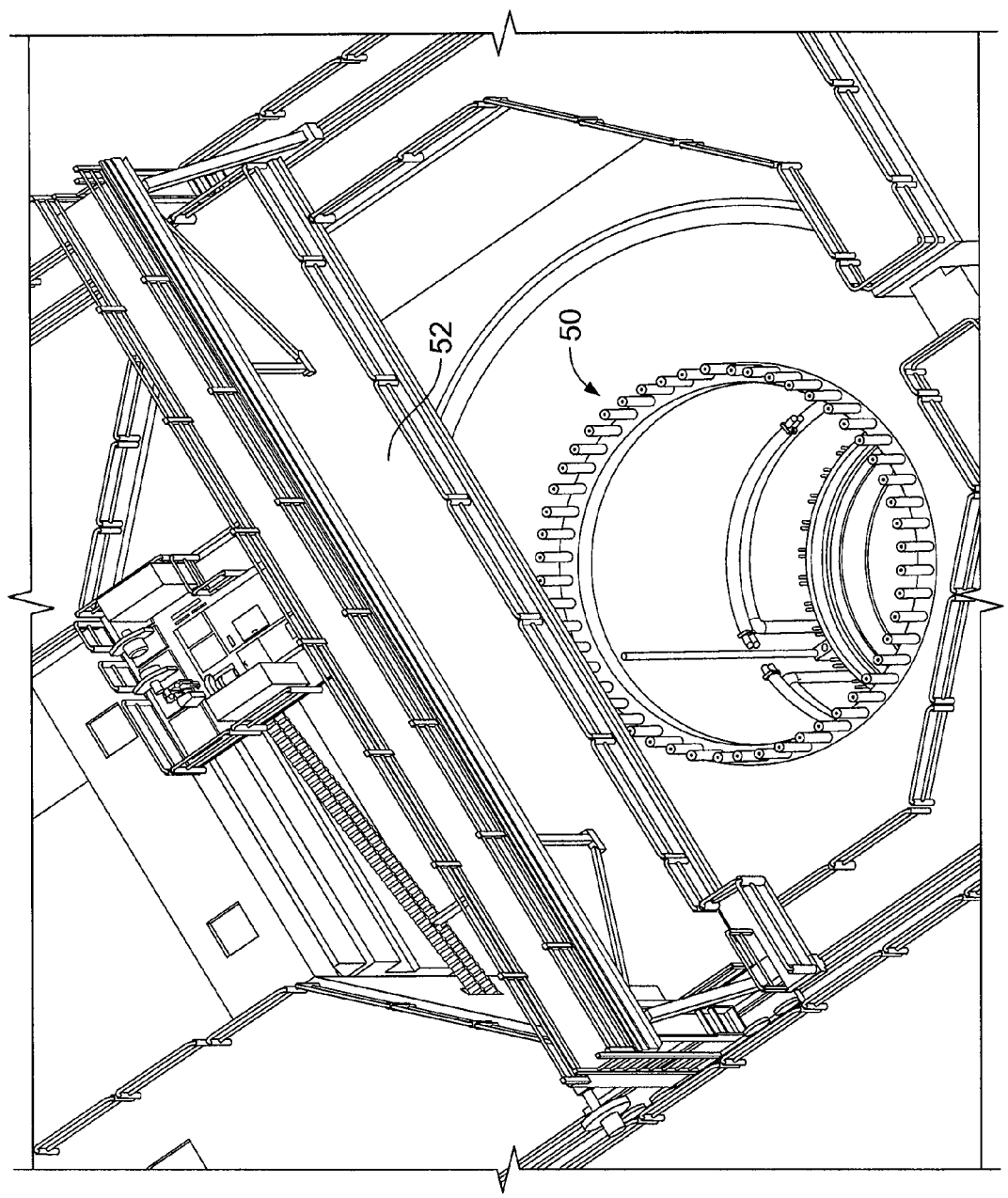
FIG. 1 schematically shows perspective view of a boiling water reactor vessel inside of a containment building.

FIG. 1 schematically shows a boiling water reactor vessel 50 inside of a containment building. A head of vessel 50 has been removed, along with a dryer and a steam separator of vessel 50 in order to allow inspection of a top guide structure inside of vessel 50. Workers may view and access the inside of vessel 50 with tools by using a refueling bridge 52 that passes over vessel 50.

Figure 2:
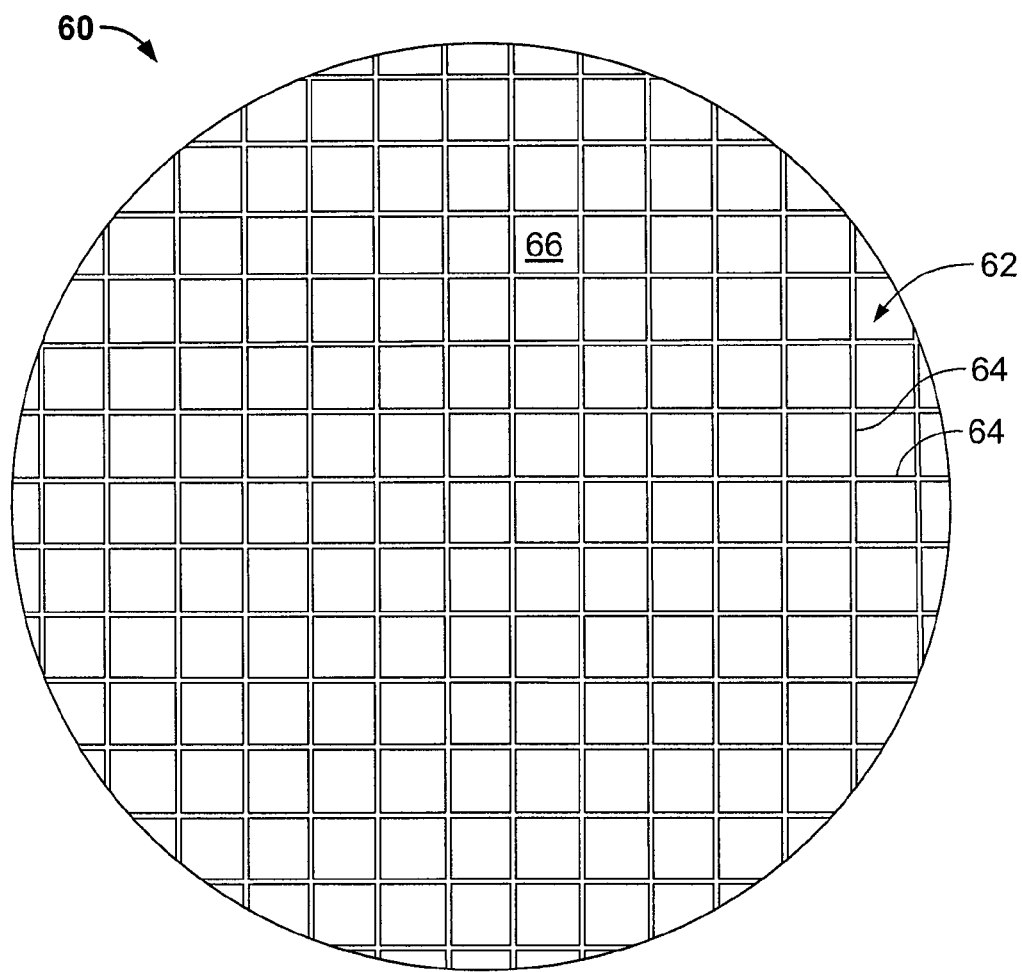
FIG. 2 schematically shows a plan view of a top guide structure of a boiling water reactor vessel.

FIG. 2 schematically shows a plan view of a top guide structure 60. Top guide structure includes a grid structure 62 formed by a plurality of beams 64. Beams 64 each include slots formed on upper and lower surfaces of beams 64 so that slots of overlapping beams 64 can be mated to form grid structure. Intersecting beams 64 form a plurality of cells 66, which vertically orient fuel assemblies inside of reactor vessel 50 (FIG. 1).

Figure 3:
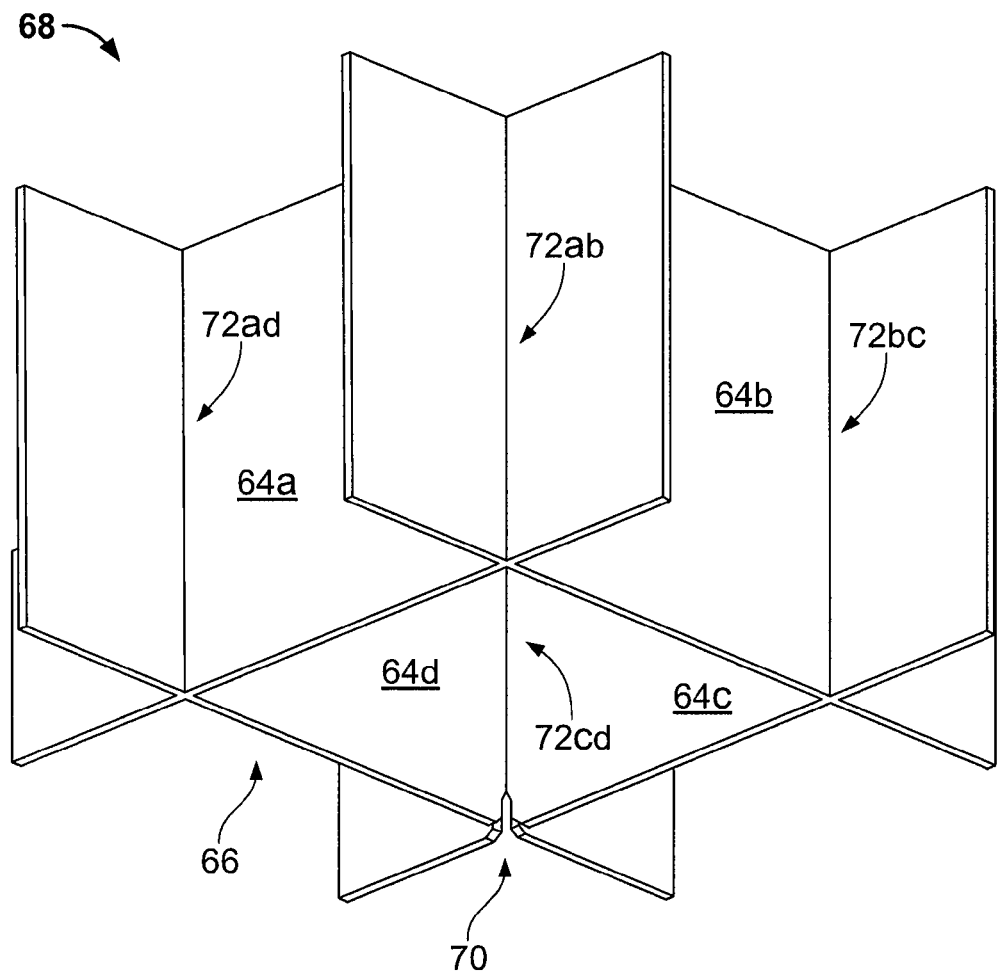
FIG. 3 schematically shows a perspective view of a section of the top guide structure shown in FIG. 2.

FIG. 3 schematically shows a perspective view of an exemplary section 68 of grid structure 62 shown in FIG. 2 in which four grid beams 64a, 64b, 64c, 64d intersect to define one exemplary cell 66. Grid beams 64a, 64b, 64c, 64d each include slots formed therein for mating at assembly areas 72ab, 72bc, 72cd, 72ad (i.e., corners of cells 66). For example, at assembly area 72ab, the top half of beam 64b is removed to form a slot in beam 64b and the bottom half of beam 64a is removed to form a slot in beam 64a and beams 64a, 64b are mated via there slots. Beams 64c, 64d each include cutout portions on lower surfaces of beams 64c, 64d that form an instrumentation pocket 70 where an instrumentation plunger can be inserted. A plurality of instrumentation pockets 70 may be formed throughout grid structure 62 (FIG. 2).

Figure 4:
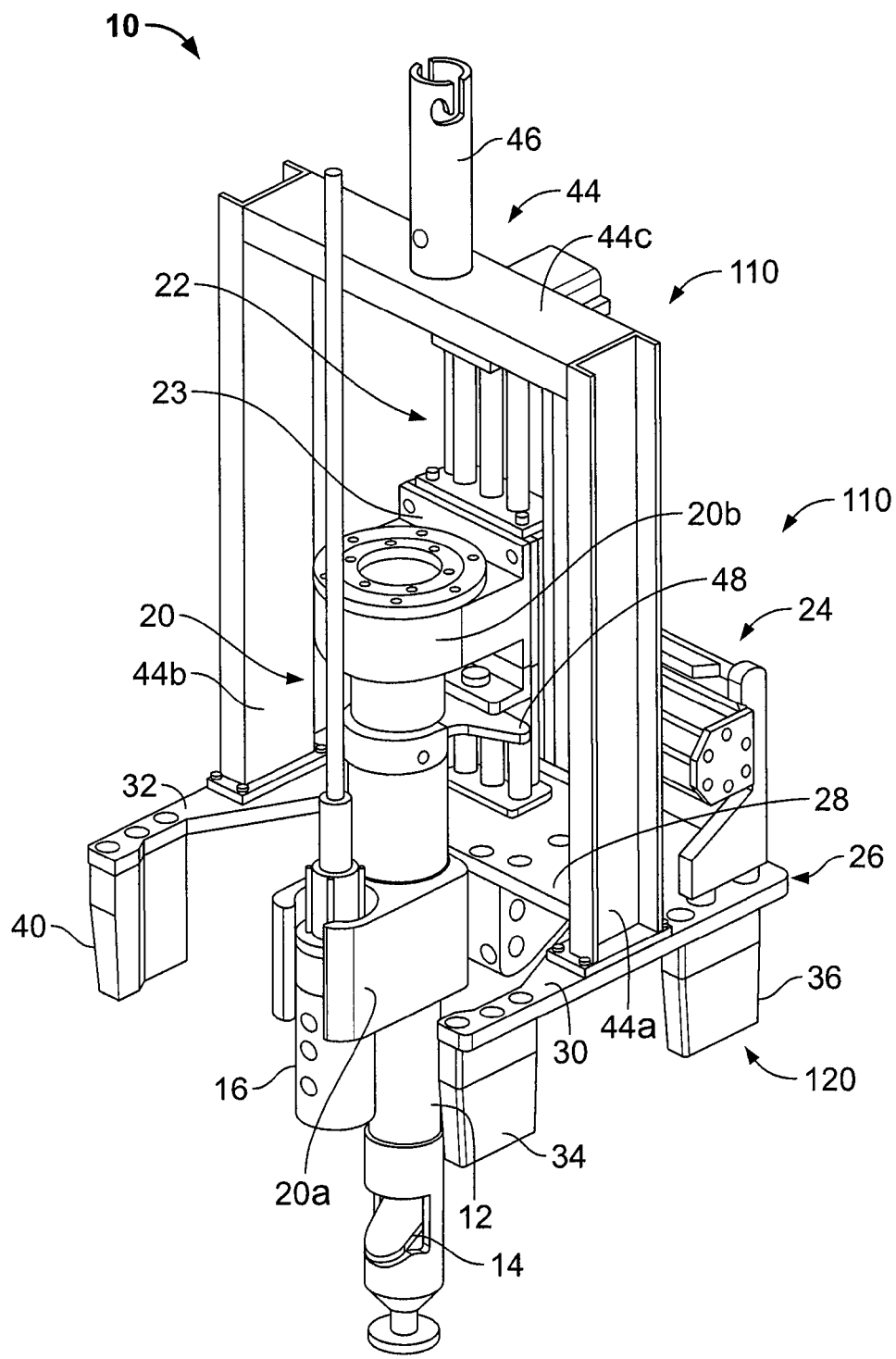
FIGS. 4 and 5 schematically show perspective views of an inspection tool according to an embodiment of the present invention for inspecting a top guide structure.
Figure 5:
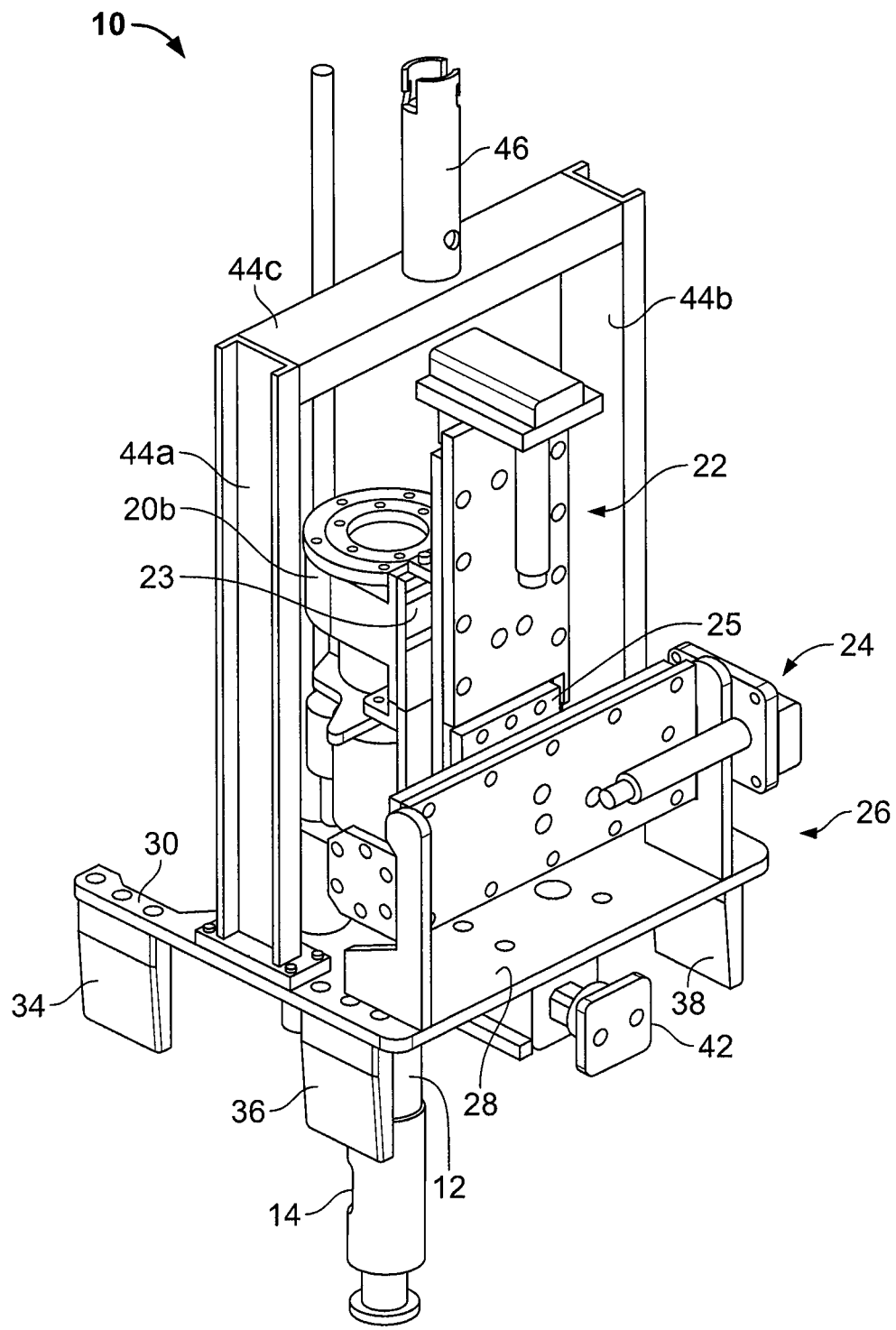

FIGS. 4 and 5 schematically show perspective views of an inspection tool 10 according to an embodiment of the present invention for inspecting a top guide structure in a nuclear reactor, for example, top guide structure 60 (FIG. 2) of boiling water reactor vessel 50 (FIG. 1). Inspection tool 10 includes a video camera 12, an auxiliary light 16 connected to camera 12 by a bracket 20a of a light and camera mount 20, an actuation device 110 connected to camera 12 and a support structure 120 connected to actuation device 110 for mounting tool 10 within one of cells 66 (FIG. 2). Light and camera mount 20 also includes an upper portion 20b that couples light 16 and camera 12 to actuation device 110. Camera 12 includes a right angle lens 14 at a lower end of camera 12. When placed within one of cells 66 of top guide structure 60 (FIG. 2), for example cell 66 defined by grid beams 64a, 64b, 64c, 64d shown in FIG. 3, camera 12 is aligned vertically and right angle lens 14 is positioned to allow video camera 12 to capture images of portions of the grid beams 64a, 64b, 64c, 64d that are in an area that is horizontally adjacent to right angle lens 14 (i.e., approximately perpendicular to lens 14). Light 16 may be aligned parallel to camera 12 above right angle lens 14. Light 16 is positioned with respect to right angle lens 14 such that light 16 illuminates the surface of cell 66 that is facing right angle lens 14.

Actuation device 110 includes a vertical slide 22 and a horizontal slide 24. An upper portion of camera 12 is coupled to a vertical slide block assembly 23 of vertical slide 22, which is substantially parallel to camera 12. Vertical slide 22 may adjust a vertical position of right angle lens 14 and light 16 with respect to support structure 120. Vertical slide 22 may be coupled to a horizontal slide block assembly 25 of horizontal slide 24. Vertical slide 22 and horizontal slide 24 may each include respective reversible air motors, internal gear heads and lead screws for moving respective block assemblies 23, 25. The use of air motors may be advantageous in the area of top guide structure 60 (FIG. 2) because air motors are tolerant of the very high dose rate and the temperature in the area of top guide structure 60. The motors may be used with the integral gear heads to drive the lead screw of each slide 22, 24. Horizontal slide 24 may move vertical slide 22 horizontally, adjusting the horizontal position of right angle lens 14 and light 16.

Support structure 120 includes a base plate 26, guides 34, 36, 38, 40 and a handle 44. Horizontal slide 24 is mounted on a base plate 26. In this embodiment, base plate 26 includes a main portion 28 supporting horizontal slide 24 and two side extensions 30, 32 that are coplanar with main portion 28 and extend away from main portion 28 and horizontal slide 24. Base plate 26 surrounds lens 14 and light 16 on three sides and are positioned with respect to lens 14 and light 16 so as not to obstruct the recording by lens 14 on a forth side. Guides 34, 36, 38, 40 extend vertically downward from corners of base plate 26, with guides 34, 40 being coupled to ends of side extensions 30, 32, respectively, and guides 36, 38 being coupled to ends of main portion 28. Tool 10 may be clamped into position within a cell of the top guide structure by a clamp 42 that may include a pneumatic cylinder for pushing against one of beams 64a, 64b, 64c, 64d (FIG. 3).

Handle 44 includes vertical uprights 44a, 44b coupled to base plate 26 and a horizontal beam 44c connecting vertical uprights 44c so that handle 44 extends around camera 12 and vertical slide 22. At least one pole 46 is a connected to horizontal beam 44c. A cam 48 may be connected to mount 20 or camera 12 for horizontally turning camera 12. A first arm of cam 48 contacts vertical upright 44a to rotate camera 12 horizontally in a first direction and a second arm of cam 48 contacts vertical upright 44b to rotate camera 12 horizontally in a second direction. Tool 10 may be delivered into one of cells 66 of top guide structure 60 by pole 46 from a refueling bridge or an auxiliary bridge located above the nuclear reactor. Umbilicals (e.g., system hoses for slides 22, 24 and clamp 42 and cables for camera 12 and light 16) for operating tool 10 may be managed by attaching the umbilicals to the poles. Slides 22, 24 and clamp 42 may be controlled by a pneumatic control panel mounted on a hand rail of refueling bridge 52 (FIG. 1). The pneumatic control panel may include valves that can be manually operated by a worker. In a preferred embodiment, slides 22, 24 may move at speed of approximately 0.5 inch per second and approximately 140 psi air may be provided to the air motors.

The stability of tool 10, when mounted within one of cells 66 of top guide structure 60 may advantageously allow camera 12 to provide high quality video. Tool 10 allows the bottom two inches of grid beams 64 of interior surfaces of grid beams 64 in the cell 66 to be inspected, along with assembly areas 72 of the interlocking grid beams 64 and instrumentation pockets 70.

Figure 6:
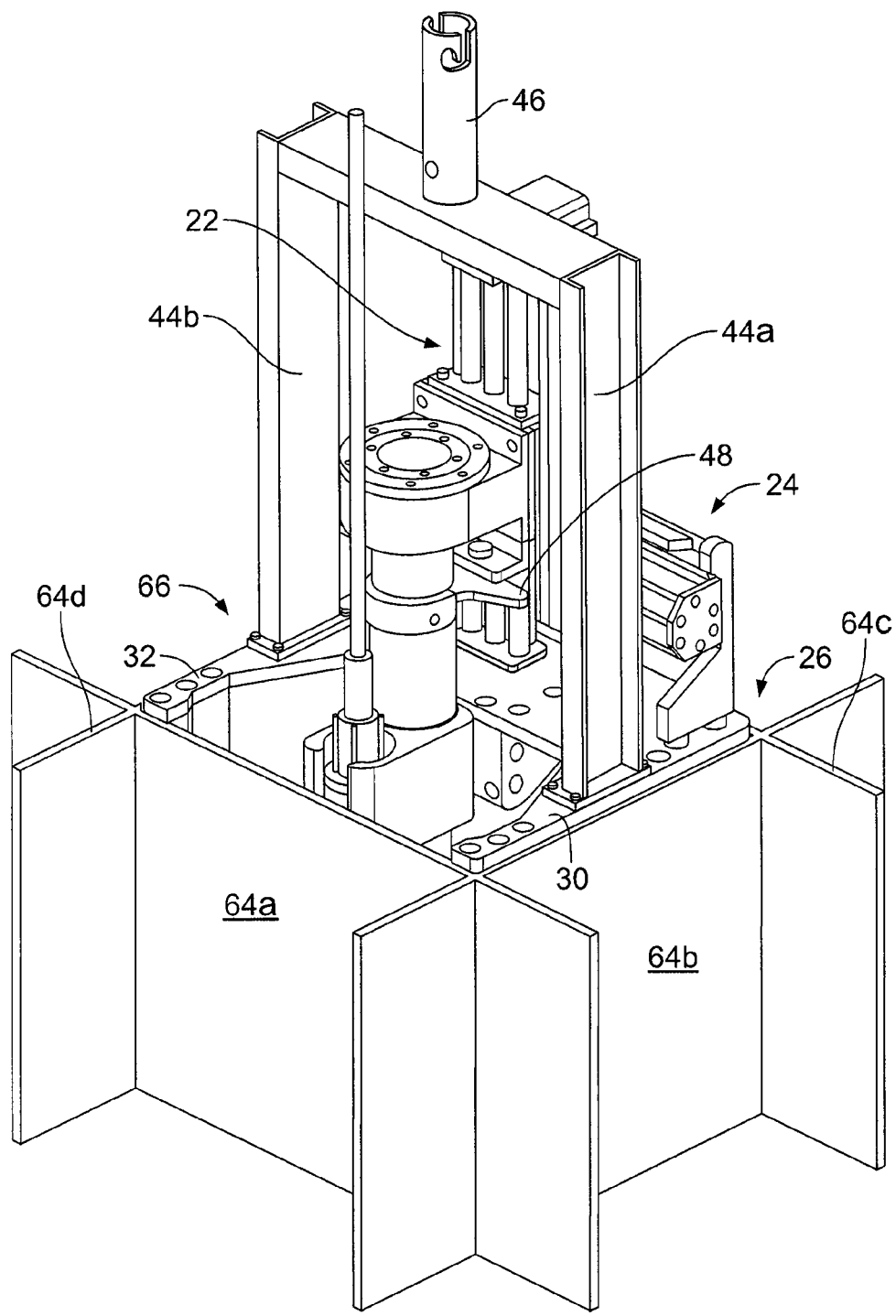
FIG. 6 schematically shows the tool shown in FIGS. 4 and 5 mounted within a cell of a top guide structure.

FIG. 6 schematically shows tool 10 mounted within one of cells 66. Base plate 26 rests on the top surfaces of grid beams 64a, 64b, 64c, 64d and guides 34, 36, 36, 38 (FIGS. 4, 5) are in contact with corners of cell 66. Camera 12 extends downward into cell 66 to record images of areas of interest of grid beams 64a, 64b, 64c, 64d.

In one preferred embodiment of an inspection method of the invention, fuel assemblies are removed from cell 66 before tool 10 is inserted into cell 66 by one or more workers holding pole 46. Once tool 10 is positioned in cell 66 such that base plate 26 rests on the top surfaces of grid beams 64a, 64b, 64c, 64d and guides 34, 36, 36, 38 (FIGS. 4, 5) are in contact with corners of cell 66, clamp 42 is forced against the interior of grid beam 64c. Camera 12 is then moved horizontally by horizontal slide 24 towards an interior corner of cell 66. As camera 12 approaches the interior corner of cell 66, the first arm of cam 48 contacts vertical upright 44a and rotates camera 12 and light 16 for example approximately twenty-five degrees horizontally so that right angle lens 14 faces and light 16 illuminates assembly area 72ab (FIG. 3) of cell 66. While camera 12 and light 16 are held in this angled orientation by the contact between the first arm of cam 48 and vertical upright 44a, camera 12 and light 16 are moved vertically by vertical slide 22 so that camera 12 can inspect the assembly area 72ab (FIG. 3) where grid beams 64a and 64b intersect. Camera 12 may only inspect the bottom half of assembly area 72ab (FIG. 3) (e.g., where edges of slots of beams 64a, 64b contact each other).

After assembly area 72 of grid beams 64a and 64b is inspected, camera 12 is moved vertically downward by vertical slide 22 so that right angle lens 14 is vertically positioned to inspect approximately the bottom two inches of grid beam 64a. Camera 12 and light 16 are moved horizontally by horizontal slide 24 along the bottom edge of grid beam 64a. As camera 12 and light 16 are moved away from the interior corner defined by grid beams 64a, 64b, the first arm of cam 48 comes out of contact with vertical upright 44a and camera 12 is rotated back so that right angle lens 14 faces the interior surface of grid beam 64a. Horizontal slide 24 moves camera 12 horizontally until the second arm of cam 48 contacts vertical upright 44b. The second arm of cam 48 contacts vertical upright 44b to rotate camera 12 for example approximately 25 degrees horizontally so that right angle lens 14 faces and light 16 illuminates assembly area 72ad (FIG. 3) of cell 66 formed by the intersection of grid beams 64a, 64d. While camera 12 and light 16 are held in this angled orientation by the contact between the second arm of cam 48 and vertical upright 44b, camera 12 and light 16 are moved vertically by vertical slide 22 so that camera 12 can inspect the assembly area 72ad (FIG. 3).

After assembly area 72 of grid beams 64a and 64b is inspected, camera 12 may be horizontally and vertically centered in tool 10. Clamp 42 may then be brought out of contact with grid beam 64c so that tool 10 can be removed from cell 66 by workers on refueling bridge 52 via polls of tool 10. Workers may rotate tool ninety degrees and insert tool 10 back into cell 66 so that for example grid beam 64b may be inspected in the same manner as grid beam 64a. The process described above can then be used to inspect grid beams 64c, 64d to complete inspection of cell 66. Tool 10 can then be moved by the workers to a different cell to inspect the different cell in the same manner. During each refueling event approximately five to ten cells may be inspected.

In one preferred embodiment, camera 12 may be calibrated inside of cell 66 by a card mounted one of beams 64a, 64b, 64c, 64d. This may advantageously allow prevent camera 12 from becoming uncalibrated during the process of mounted tool 10 within cell 66.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for inspecting a cell formed by grid beams of a top guide structure in a nuclear reactor comprising:
   providing a tool including a visual inspection camera within the cell so that the tool contacts at least one of the grid beams and sits within the cell; and
   visually inspecting a first grid beam of the grid beams while the tool sits within the cell by moving the camera along the first of the grid beams, the visually inspecting including angling the camera toward a first corner of the cell, the tool including a cam and at least one vertical support, the cam contacting the at least one vertical support to angle the camera towards the first corner of the cell.

2. The method recited in claim 1 further comprising:
   rotating the tool ninety degrees; and inspecting a second of the grid beams while the tool sits within the cell by moving the camera along the second of the grid beams.

3. The method recited in claim 2 further comprising removing the tool from the cell before the rotating step.

4. The method recited in claim 1 wherein the inspecting step includes:
moving the camera horizontally along a bottom of the first grid beam; and
inspecting a second corner of the cell.

5. The method recited in claim 4 wherein at least one of the inspecting the first corner of the cell and the inspecting the second corner of the cell includes rotating the camera horizontally toward the second corner and moving the camera vertically.

6. The method recited in claim 1 further comprising clamping the tool inside of the cell using a clamp forced against one of the grid beams inside the cell before the inspecting step.

7. The method as recited in claim 4 wherein the tool sits within the cell as the camera is moved horizontally along a bottom of the first grid beam.

8. The method as recited in claim 4 wherein the camera is released from being angled as the camera is moved horizontally along the bottom of the first grid beam and the camera is angled towards the second corner during the inspection of the second corner.

9. The method as recited in claim 1 wherein the camera is moved vertically by at least one vertical slide of the tool as the camera is angled towards the first corner of the cell by the cam.

10. The method as recited in claim 4 wherein the moving the camera horizontally along the bottom of the first grid beam includes sliding the camera with at least one horizontal slide of the tool.

11. The method as recited in claim 1 wherein the tool includes a base, the base resting on top surfaces of three of the grid beams forming the cell during the visually inspecting.

12. The method as recited in claim 11 wherein the tool includes four guides extending downward from the base, the four guides being in contact with three grid beams of the cell inside the cell during the visually inspecting.

13. The method as recited in claim 12 wherein the tool includes a pneumatic clamp connected to a bottom of the base, the pneumatic clamp being pushed against one of the grid beams during the visually inspecting.

14. The method as recited in claim 1 wherein the visually inspecting includes illuminating the first grid beam.

15. The method as recited in claim 14 wherein the first grid beam is illuminated by a light mounted on the camera, the light moving horizontally and vertically with the camera.

16. A method for inspecting a cell formed by sections of grid beams of a top guide structure in a nuclear reactor comprising:

providing a tool including a camera within the cell so that the tool contacts at least one of the grid beams inside the cell and sits within the cell such that the tool does not extend laterally past the sections of the grid beams forming the cell; and
inspecting a first grid beam of the grid beams while the tool sits within the cell by moving the camera horizontally along the first grid beam.

17. The method as recited in claim 16 wherein the inspecting includes illuminating the first grid beam with a light mounted on the camera, the camera and the light being rotated together in a horizontal plane inside with cell to visually inspect a corner of the cell at an end of the first grid beam.

18. A method for inspecting a cell formed by grid beams of a top guide structure in a nuclear reactor comprising:
providing a tool including a visual inspection camera within the cell so that the tool contacts at least one of the grid beams and sits within the cell;
clamping the tool inside of the cell using a clamp forced against an interior of one of the grid beams inside the cell; and
visually inspecting a first grid beam of the grid beams while the tool sits within the cell by moving the camera vertically along a corner formed by the first grid beam and a second grid beam of the grid beams and moving the camera horizontally along a bottom edge of the first grid beam.

19. A method for inspecting a cell formed by grid beams of a top guide structure in a nuclear reactor comprising:
providing a tool including a visual inspection camera within the cell so that the tool contacts at least one of the grid beams and sits within the cell; and
visually inspecting a first grid beam of the grid beams while the tool sits within the cell by moving the camera along the first of the grid beams,
wherein the tool includes a base and guides extending downward from the base, the base resting on top surfaces of the grid beams forming the cell and the guides contacting corners of the cell inside the cell during the visually inspecting.

20. The method as recited in claim 19 wherein the base rests on top surfaces of three of the grid beams forming the cell during the visually inspecting, the guides including four guides extending downward from the base, the four guides being in contact with three grid beams of the cell inside the cell during the visually inspecting.

21. The method as recited in claim 19 wherein the tool includes a clamp connected to a bottom of the base, the clamp being pushed against one of the grid beams inside the cell during the visually inspecting.

* * * * *